(12) United States Patent
Sunkara et al.

(10) Patent No.: US 12,217,196 B2
(45) Date of Patent: *Feb. 4, 2025

(54) FACILITATING DEVICE FINGERPRINTING THROUGH ASSIGNMENT OF FUZZY DEVICE IDENTIFIERS

(71) Applicant: Microsoft Technology Licensing, LLC, Redmond, WA (US)

(72) Inventors: Ram Prasad Sunkara, Sammamish, WA (US); Shoou-Jiun Wang, Sammamish, WA (US); Jayaram NM Nanduri, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

This patent is subject to a terminal disclaimer.

(21) Appl. No.: 18/097,083

(22) Filed: Jan. 13, 2023

(65) Prior Publication Data

US 2023/0222369 A1 Jul. 13, 2023

Related U.S. Application Data

(63) Continuation of application No. 16/222,597, filed on Dec. 17, 2018, now Pat. No. 11,556,823.

(51) Int. Cl.
*H04L 9/40* (2022.01)
*G06F 16/23* (2019.01)
(Continued)

(52) U.S. Cl.
CPC ......... *G06N 5/048* (2013.01); *G06F 16/2365* (2019.01); *G06N 20/00* (2019.01); *G06Q 20/409* (2013.01)

(58) Field of Classification Search
CPC ... H04L 63/102; H04L 63/0876; H04L 63/08; G06F 21/44; G06F 16/2365; G06F 18/22;
(Continued)

(56) References Cited

U.S. PATENT DOCUMENTS

2016/0155128 A1* 6/2016 Desai ................. H04L 63/0876
705/44
2018/0107924 A1* 4/2018 Benson ................. G06N 20/10
(Continued)

OTHER PUBLICATIONS

Communication under rule 71(3) EPC, Received for European Application No. 19831964.2, mailed on Mar. 4, 2024, 09 pages.
(Continued)

*Primary Examiner* — Ali S Abyaneh
(74) *Attorney, Agent, or Firm* — Ray Quinney & Nebeker; James Bullough

(57) ABSTRACT

Various device attributes associated with a current event may be obtained. Similarity metrics may be determined that indicate a degree of similarity between the device attributes that are associated with the current event and stored device attributes that are associated with previous events and previously created fuzzy device identifiers. A fuzzy device identifier may be assigned to the current event based at least in part on a comparison of the similarity metrics with a threshold. If none of the similarity metrics compare favorably with the threshold, then a new fuzzy device identifier may be created for the current event. However, if at least one of the similarity metrics compares favorably with the threshold, then the previously created fuzzy device identifier whose stored device attributes are most similar to the device attributes that are associated with the current event may be assigned to the current event.

18 Claims, 11 Drawing Sheets

(51) Int. Cl.
  *G06N 5/048*    (2023.01)
  *G06N 20/00*    (2019.01)
  *G06Q 20/40*    (2012.01)
(58) Field of Classification Search
  CPC .. G06F 16/90344; G06F 21/31; H04W 12/75;
       G06N 5/048; G06N 20/00; G06Q 20/409
  See application file for complete search history.

(56) References Cited

U.S. PATENT DOCUMENTS

2018/0329962 A1* 11/2018 Schrijen ................ H04L 9/3278
2020/0067777 A1*  2/2020 Tandel ................... H04L 41/12

OTHER PUBLICATIONS

U.S. Appl. No. 16/222,597, filed Dec. 17, 2018.
"Office Action Issued in European Patent Application No. 19831964.2", Mailed Date: Dec. 8, 2022, 10 Pages.

* cited by examiner

FIG. 8A

| Global Device ID 884 | Fuzzy Device ID 886 | GID Count 896 | FID Count 898 | Status Label 888 |
|---|---|---|---|---|
| G4 | F6 | 1 | 1 | Accurate |
| G4 | F7 | 2 | 1 | False Negative |
|  |  |  |  |  |

FIG. 8B

FACILITATING DEVICE FINGERPRINTING THROUGH ASSIGNMENT OF FUZZY DEVICE IDENTIFIERS

CROSS REFERENCE TO RELATED APPLICATIONS

This application is a Continuation of U.S. application Ser. No. 16/222,597, filed on Dec. 17, 2018, the entirety of which is incorporated herein by reference.

BACKGROUND

Device fingerprinting is a technique for identifying computing devices based on their unique configurations. Device fingerprinting services create fingerprints based on a combination of different types of information about a device, such as operating system type and version, web browser type and version, screen resolution, font size, language, time zone, etc.

Electronic commerce merchants and website owners often use device fingerprinting for marketing. By analyzing the browser history of an identified device, website owners can predict the user's preferences. These analytical results can be utilized to show more relevant content to improve user engagement and also to customize the display of advertisements. This can lead to increased revenue by attracting more clicks.

Device fingerprinting can also be used for fraud detection. Because devices are relatively expensive, fraudsters typically have a small number of devices and would like to use them for as many fraudulent transactions as possible. Consequently, they often disguise their devices to avoid being identified. A small set of devices (or even just a single device) may be used to make many transactions. Successfully determining that those transactions are from one device or a small set of devices can help electronic commerce merchants reject the transactions to prevent loss.

Unfortunately, fraudsters often try to manipulate or block device settings in order to disguise their device fingerprints. There are many malicious software products available today that can spoof a device's Internet Protocol (IP) address and overwrite any information that is stored on the device to make the transactions from a device look like they are coming from all over the world from devices of different configurations. The technologies that fraudsters use to disguise their true identities are becoming more advanced and difficult to detect every day.

Although there are various device fingerprinting algorithms in use today, there is no good way to evaluate the quality of a device fingerprinting algorithm. One of the problems is the lack of ground truth labels. In other words, when a device fingerprinting algorithm is used to assign device fingerprints to particular transactions, there is often no set of data to compare against to determine whether those assignments are correct. This makes it difficult to quantify the performance of a device fingerprinting algorithm.

Even if ground truth is sometimes known (e.g., if globally unique device identifiers are available in connection with some transactions), there are still many other technical challenges associated with device fingerprinting. For example, some devices might visit a website hundreds of times (or more) while other devices might only visit the website a few times. This highly skewed distribution makes it difficult to achieve accurate results. Also, device fingerprinting solutions need to be implemented in real time. With the volume of traffic that many websites experience, it can be extremely challenging to match one electronic commerce event with the existing thousands of millions of devices in a few milliseconds. Sophisticated device fingerprinting algorithms and fast computing devices are needed in order to achieve fast and accurate results.

SUMMARY

The present disclosure is generally related to the use of a fuzzy device identifier (ID) in connection with device fingerprinting. In this context, the term "fuzzy" is used to describe a type of device ID that is not based on ground truth (e.g., is not based on a globally unique device ID) but is instead based on other attributes about the device. There are many different types of device attributes that may be utilized to create a fuzzy device ID in accordance with the present disclosure. A few examples include operating system type and version, web browser type and version, screen resolution, font size, language, time zone, etc.

In accordance with the present disclosure, fuzzy device IDs may be assigned to events that are associated with websites. In this context, the term "event" refers to any type of interaction with a website where information about a device is submitted to the website. To assign a fuzzy device ID to a current event, various device attributes associated with the current event may be obtained. Then, similarity metrics may be determined that indicate a degree of similarity between the device attributes that are associated with the current event and stored device attributes that are associated with previous events and previously created fuzzy device IDs. A fuzzy device ID may be assigned to the current event based at least in part on a comparison of the similarity metrics with a threshold.

For example, if none of the similarity metrics compare favorably with the threshold, then a new fuzzy device ID may be created for the current event. However, if at least one of the similarity metrics compares favorably with the threshold, then the previously created fuzzy device ID whose stored device attributes are most similar to the device attributes that are associated with the current event may be assigned to the current event. A similarity metric may compare favorably to the threshold by being above or below the threshold, depending on the characteristics of the similarity metric (as will be discussed in greater detail below).

In some embodiments, the similarity metrics may be determined through the use of a logistic regression model. For example, a dataset may be created that includes results of comparing the device attributes that are associated with the current event and stored device attributes that are associated with previous events and previously created fuzzy device IDs. This dataset may be provided as input to a logistic regression model, which produces the similarity metrics.

To increase the accuracy of the similarity metrics produced by the logistic regression model, the dataset may include weighted values. In some embodiments, the weighted values may take the form of inverse frequency smoothing values.

In some embodiments, the similarity metrics may be determined through attribute encoding matrices. For example, the device attributes that are associated with the current event may initially be represented as character strings, and the attribute encoding matrices may be used to transform the character strings to numeric values. Distances may be determined between a vector that includes the numeric values and a plurality of other vectors representing the stored device attributes that are associated with the previous events and the previously created fuzzy device identifiers. These distances are examples of the similarity metrics referred to above.

Another aspect of the present disclosure is related to training the attribute encoding matrices. A training dataset may be created. The training dataset may include a plurality of triplets. Each triplet may include an anchor event, a positive event, and a negative event. The positive event has the same global device ID as the anchor event. The negative event has a different global device ID than the anchor event but is similar to the anchor event in some respects. The attribute encoding matrices may be used to transform the triplets in the training dataset into encoded triplets that include numeric values. The encoded triplets may then be provided as inputs to a cost function, and adjustments may be made to the encoding matrices based at least in part on outputs of the cost function.

Another aspect of the present disclosure is related to determining the accuracy of fuzzy device ID assignments. Fuzzy device IDs may be assigned to events for which global device IDs are known. A status label may be assigned to each of the assigned fuzzy device IDs based on defined rules. The rules may specify that a status label of accurate is assigned when a first-time fuzzy device identifier is assigned to a first-time global device identifier. The rules may also specify that a false negative status label is assigned when an already assigned global device identifier is assigned to an unassigned fuzzy device identifier. The rules may also specify that a false positive status label is assigned when an already assigned fuzzy device identifier is assigned to an unassigned global device identifier. The status labels may be used to determine an accuracy metric that indicates accuracy of the assignment of the plurality of fuzzy device IDs.

BRIEF DESCRIPTION OF THE DRAWINGS

FIGS. 8A and 8B illustrate an example showing how the rules shown in FIG. 7 may be applied to evaluate the assignment of fuzzy device IDs.

DETAILED DESCRIPTION

Figure 1:
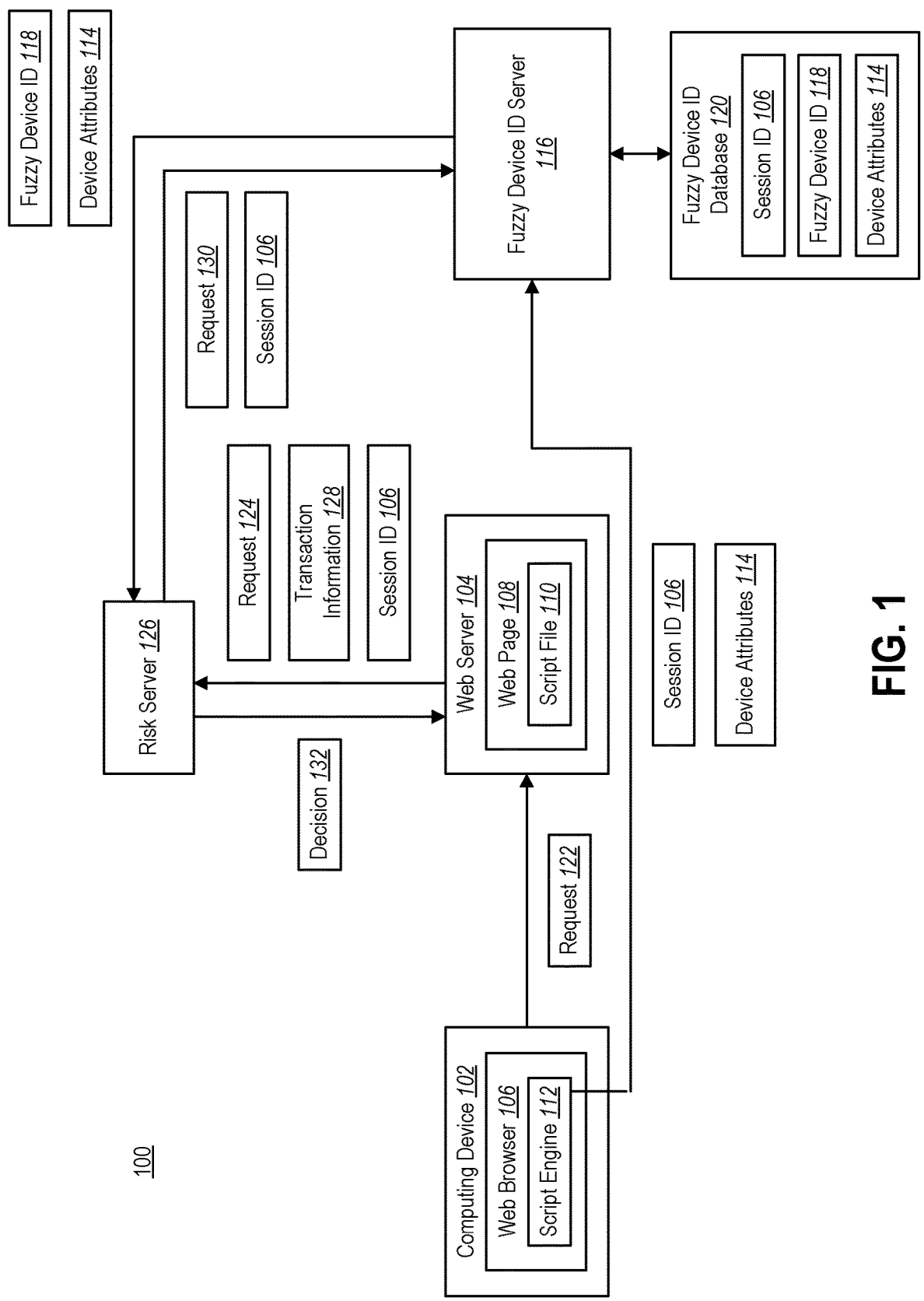
FIG. 1 illustrates an example of a system in which fuzzy device IDs may be utilized.

As discussed above, the present disclosure is generally related to the use of fuzzy device IDs in connection with device fingerprinting. FIG. 1 illustrates an example of a system 100 in which fuzzy device IDs may be utilized. The system 100 includes a computing device 102 in electronic communication with a web server 104 via the Internet. The computing device 102 may be, for example, a desktop computer, a laptop computer, a tablet computer, a smartphone, or the like. For simplicity, the computing device 102 may be referred to herein simply as a device 102. A communication session is established between a web browser 106 on the device 102 and the web server 104. A session ID 108 is assigned to the communication session. The session ID 108 may be a globally unique identifier (GUID).

When the user of the device 102 navigates the web browser 106 to a uniform resource locator (URL) corresponding to a web page 108 that is maintained by the web server 104, the web server 104 sends the web page 108 to the web browser 106. The web page 108 includes a script file 110. The script file 110 is executed by a script engine 112 within the web browser 106 to perform certain operations. For example, the script engine 112 may execute the script file 110 to collect information about attributes 114 of the device 102. The attributes 114 may include device-level attributes (instead of just user-level attributes), and therefore may be referred to herein as device attributes 114.

The device 102 (via the script engine 112 executing the script file 110) may send the device attributes 114 to a fuzzy device ID server 116 along with the session ID 106. The fuzzy device ID server 116 may use the device attributes 114 to create a fuzzy device ID 118. The fuzzy device ID 118 may be stored in a database 120 (which may be referred to herein as a fuzzy device ID database 120) and associated with the session ID 106 and the device attributes 114.

At some point, there may be an event for which authorization from a risk server 126 should be obtained. For example, the user of the device 102 may want to perform a transaction on the web page 108, such as making a purchase. The user may provide some type of input to the device 102 to initiate the transaction. In response to this user input, the web browser 106 may send a request 122 to the web server 104 for the transaction to occur.

In response to receiving this request 122 from the web browser 106, the web server 104 may send a request 124 to a risk server 126 for authorization to proceed with the transaction. The web server 104 may also send certain information 128 associated with the transaction to the risk server 126. This information 128, which may be referred to herein as transaction information 128, may be used by the risk server 126 to determine whether or not the transaction should be authorized. The web server 104 may also send the session ID 106 to the risk server.

In response to receiving the request 124, the risk server 126 may send a request 130 to the fuzzy device ID server 116 for a fuzzy device ID 118 corresponding to the event. The session ID 106 associated with the event may be included with the request 130. In response to receiving this request 130, the fuzzy device ID server 116 identifies the fuzzy device ID 118 that is associated with the session ID 106 and sends that fuzzy device ID 118 to the risk server 126. The fuzzy device ID server 116 may also send device attributes 114 associated with the session ID 106 to the risk server 126.

The risk server 126 uses the fuzzy device ID 118 and the device attributes 114 along with the transaction information 128 that it has received from the web server 104 to determine whether the transaction is authorized or not. The risk server 126 sends a decision 132 regarding the transaction (e.g., authorized or not authorized) back to the web server 104. If the decision 132 indicates that the transaction is authorized, then the web server 104 proceeds with the transaction. If, however, the decision 132 indicates that the transaction is not authorized, then the web server 104 does not proceed with the transaction.

Figure 2:
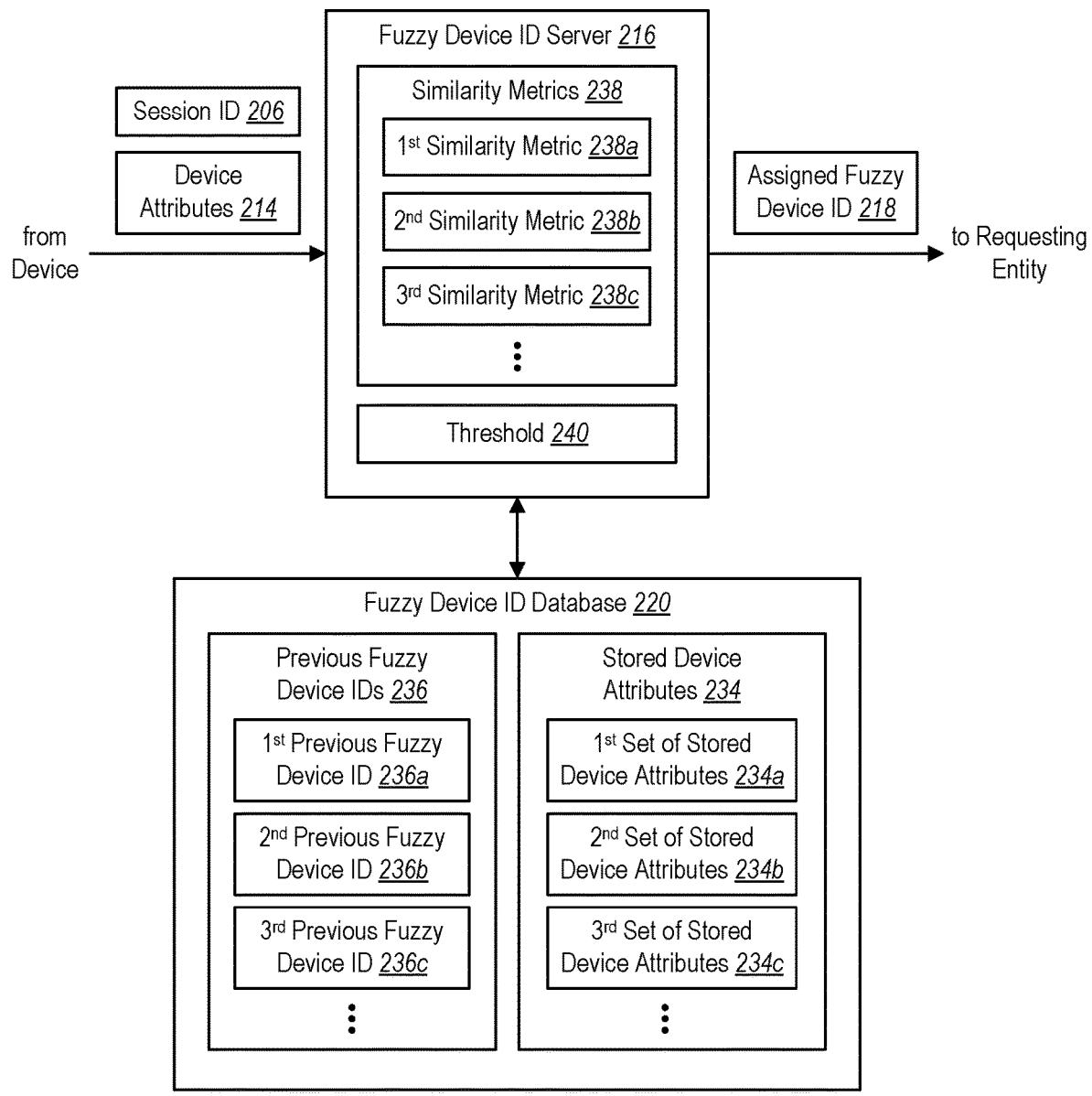
FIG. 2 illustrates an example showing how a fuzzy device ID server may assign a fuzzy device ID to an event.

FIG. 2 illustrates an example showing how a fuzzy device ID server 216 may assign a fuzzy device ID 218 to an event. The event may be referred to as a current event to distinguish it from other events for which fuzzy device IDs have previously been created. The fuzzy device ID server 216 obtains device attributes 214 that are associated with the current event. For example, the fuzzy device ID server 216 may receive the device attributes 214 from a device 102 in the manner discussed above. The fuzzy device ID server 216 may receive a session ID 206 associated with the current event along with the device attributes 214.

The fuzzy device ID server 216 may compare the device attributes 214 that are associated with the current event with stored device attributes 234 that are associated with previously created fuzzy device IDs 236 (which, for simplicity, may be referred to herein as previous fuzzy device IDs 236). The fuzzy device ID server 216 may assign a fuzzy device ID 218 to the current event based on this comparison.

More specifically, the fuzzy device ID server 216 may calculate similarity metrics 238 that indicate the degree of similarity between the device attributes 214 that are associated with the current event and the stored device attributes 234 that are associated with the previous fuzzy device IDs 236. The fuzzy device ID server 216 may assign a fuzzy device ID 218 to the current event based on the similarity metrics 238.

In the depicted example, the previous fuzzy device IDs 236 include a first previous fuzzy device ID 236*a*, a second previous fuzzy device ID 236*b*, and a third previous fuzzy device ID 236*c*. The stored device attributes 234 include a first set of stored device attributes 234*a* (which corresponds to the first previous fuzzy device ID 236*a*), a second set of stored device attributes 234*b* (which corresponds to the second previous fuzzy device ID 236*b*), and a third set of stored device attributes 234*c* (which corresponds to the third previous fuzzy device ID 236*c*).

For simplicity, only a small number of fuzzy device IDs 236 (specifically, three fuzzy device IDs 236*a-c*) and a small number of stored device attributes 234 (specifically, three sets of stored device attributes 234*a-c*) are included in the example shown in FIG. 2. Other examples discussed herein also involve relatively small numbers of fuzzy device IDs and other related information. However, the techniques disclosed herein may be used in connection with a much larger number of fuzzy device IDs and stored device attributes. Indeed, the techniques disclosed herein may be used in connection with websites that receive an extremely high volume of traffic, and that process large numbers (e.g., thousands of millions) of events and corresponding fuzzy device IDs. As will be discussed in greater detail below, the disclosed techniques provide technical benefits related to improving the efficiency of device fingerprinting solutions so that they are better able to deal with this high volume of traffic.

In the example shown in FIG. 2, the fuzzy device ID server 216 determines a first similarity metric 238*a* that indicates the degree of similarity between the device attributes 214 that are associated with the current event and the first set of stored device attributes 234*a* that are associated with the first previous fuzzy device ID 236*a*. The fuzzy device ID server 216 determines a second similarity metric 238*b* that indicates the degree of similarity between the device attributes 214 that are associated with the current event and the second set of stored device attributes 234*b* that are associated with the second previous fuzzy device ID 236*b*. The fuzzy device ID server 216 determines a third similarity metric 238*c* that indicates the degree of similarity between the device attributes 214 that are associated with the current event and the third set of stored device attributes 234*c* that are associated with the third previous fuzzy device ID 236*c*.

The fuzzy device ID server 216 may compare the similarity metrics 238*a-c* to a threshold 240. If none of the similarity metrics 238*a-c* compare favorably to the threshold 240, then the fuzzy device ID server 216 may create a new fuzzy device ID and assign the new fuzzy device ID to the event. In other words, the assigned fuzzy device ID 218 may be the new fuzzy device ID that is created. If, however, at least one of the similarity metrics 238*a-c* compares favorably to the threshold 240, then the fuzzy device ID server 216 may select one of the previous fuzzy device IDs 236*a-c* as the assigned fuzzy device ID 218. The fuzzy device ID server 216 may select the previous fuzzy device ID 236 whose stored device attributes 234 are most similar to the device attributes 214 that are associated with the current event. For example, if the second similarity metric 238*b* indicates a higher degree of similarity than any of the other similarity metrics 238*a*, 238*c*, then the fuzzy device ID server 216 may assign the second previous fuzzy device ID 236*b* to the current event. In other words, the assigned fuzzy device ID 218 may be the second previous fuzzy device ID 236*b*.

As indicated above, a similarity metric 238 may compare favorably to the threshold 240 by being above or below the threshold 240, depending on the characteristics of the similarity metric 238. For example, if the value of the similarity metric 238 increases as the similarity between the device attributes 214 and the stored device attributes 234 increases, then the threshold 240 defines a minimum value and the similarity metric 238 compares favorably to the threshold 240 by being above the threshold 240. If, however, the value of the similarity metric 238 decreases as the similarity between the device attributes 214 and the stored device attributes 234 increases, then the threshold 240 defines a maximum value and the similarity metric 238 compares favorably to the threshold 240 by being below the threshold 240.

Figure 2A:
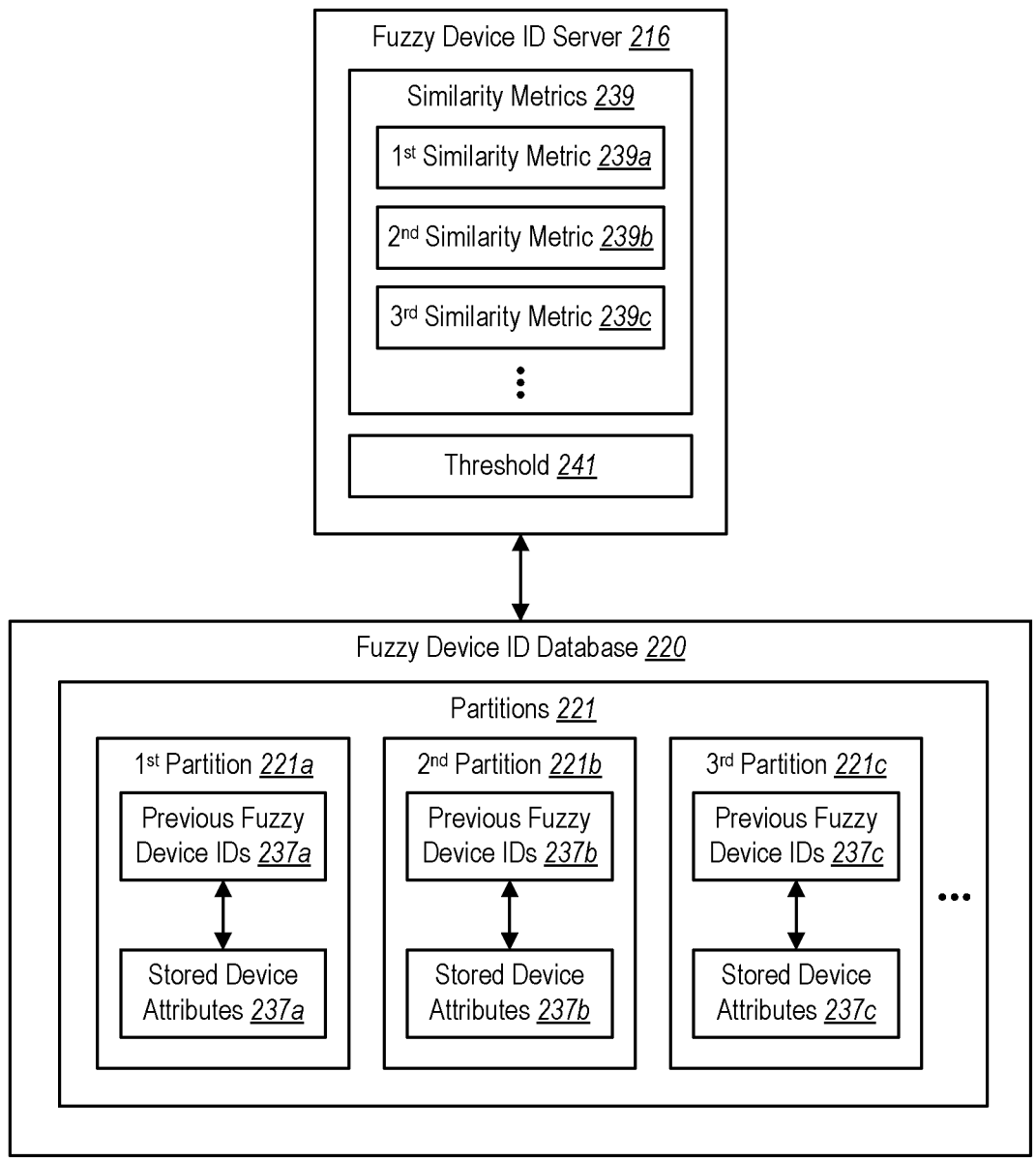
FIG. 2A illustrates an example in which a fuzzy device ID server uses a two-layer approach to assign a fuzzy device ID to an event.

FIG. 2A illustrates an example in which the fuzzy device ID database 220 includes a plurality of partitions 221, including a first partition 221*a*, a second partition 221*b*, and a third partition 221*c*. The first partition 221*a* includes a first set of previous fuzzy device IDs 237*a* and stored device attributes 237*a*. The second partition 221*b* includes a second set of previous fuzzy device IDs 237*b* and stored device attributes 237*b*. The third partition 221*c* includes a third set of previous fuzzy device IDs 237*c* and stored device attributes 237*c*.

In the example shown in FIG. 2A, the fuzzy device ID server 216 uses a two-layer approach that involves initially calculating similarity metrics 239 for the various partitions 221. For example, a first similarity metric 239*a* may be calculated for the first partition 221*a*, a second similarity metric 239*b* may be calculated for the second partition 221*b*, and a third similarity metric 239*c* may be calculated for the third partition 221*c*. These similarity metrics 239*a-c* may be used to select a particular partition 221 (e.g., by comparison with another threshold 241). Then, once a particular partition 221 has been selected, the similarity metrics 238 discussed above may be determined for particular fuzzy device IDs 236a-c.

Figure 3:
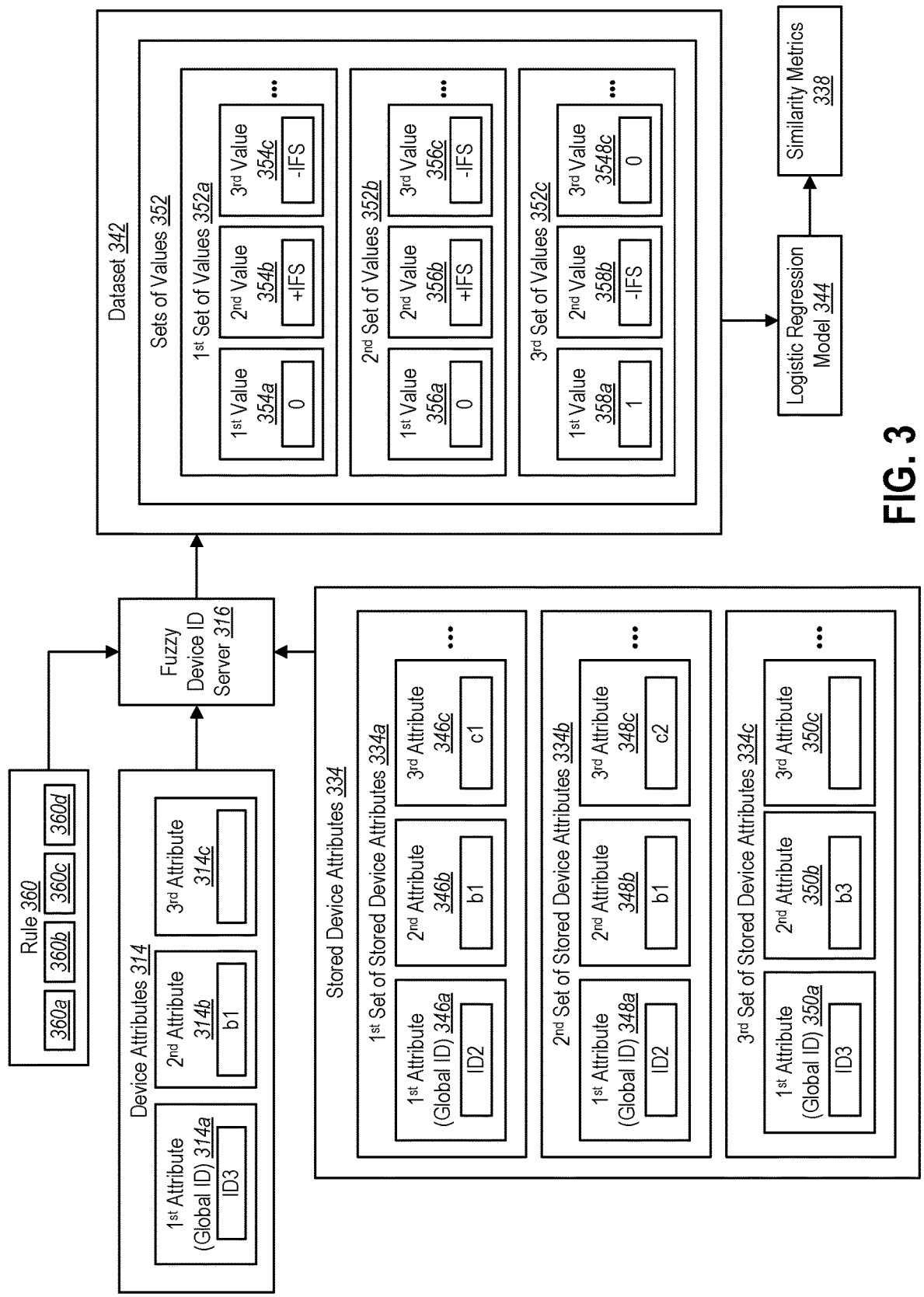
FIG. 3 illustrates an example showing how similarity metrics may be determined through the use of a logistic regression model.

As indicated above, in some embodiments similarity metrics may be determined through the use of a logistic regression model. FIG. 3 illustrates an example showing how this may occur. In the depicted example, a fuzzy device ID server 316 creates a dataset 342 that includes the results of comparing the device attributes 314 that are associated with the current event and the stored device attributes 334 that are associated with previous events and previously created fuzzy device IDs. This dataset 342 is then provided as input to a logistic regression model 344, which outputs similarity metrics 338.

The dataset 342 includes a plurality of sets of values 352, including a first set of values 352a, a second set of values 352b, and a third set of values 352c. Each set of values 352 in the dataset 342 is generated by comparing the device attributes 314 that are associated with the current event and a set of stored device attributes 334 that are associated with a previous event and a previously created fuzzy ID. For example, the first set of values 352a is generated by comparing the device attributes 314 that are associated with the current event and the first set of stored device attributes 334a. The second set of values 352b is generated by comparing the device attributes 314 that are associated with the current event and the second set of stored device attributes 334b. The third set of values 352c is generated by comparing the device attributes 314 that are associated with the current event and the third set of stored device attributes 334c.

Each value within a particular set of values 352 is generated by comparing a device attribute 314 associated with the current event and a corresponding device attribute in a set of stored device attributes 334. For example, the first value 354a in the first set of values 352a is generated by comparing the first attribute 314a associated with the current event and the first attribute 346a in the first set of stored device attributes 334a. The second value 354b in the first set of values 352a is generated by comparing the second attribute 314b associated with the current event and the second attribute 346b in the first set of stored device attributes 334a. The third value 354c in the first set of values 352a is generated by comparing the third attribute 314c associated with the current event and the third attribute 346c in the first set of stored device attributes 334a. The values 356a-c in the second set of values 352b are generated in a similar manner by comparing the attributes 314a-c associated with the current event and the corresponding attributes 348a-c in the second set of stored device attributes 334b. The values 358a-c in the third set of values 352c are generated in a similar manner by comparing the attributes 314a-c associated with the current event and the corresponding attributes 350a-c in the third set of stored device attributes 334c.

The dataset 342 includes weighted values. In the depicted example, the weighted values take the form of inverse frequency smoothing values. Certain types of device attributes are more common than others. If an uncommon device attribute 314 associated with a current event matches an attribute in a set of stored device attributes 334, this should be given greater weight than if a relatively common device attribute 314 matches an attribute in a set of stored device attributes 334. The use of inverse frequency smoothing values makes it possible to assign greater weight to the matching of less common attributes. An inverse frequency smoothing value may be calculated in accordance with equation (1) below:

$$IFS = \log\left(1 + \frac{N}{n_t}\right) \qquad (1)$$

In equation (1), the term N refers to the total number of events for which there are stored device attributes 334, whereas the term $n_t$ refers to the total number of events with a specific attribute. Thus, the rarer the attribute is, the higher the weight (i.e. the IFS value).

The fuzzy device ID server 316 follows defined rules 360 to generate the dataset 342. In the depicted example, there are four rules 360a-d that govern the creation of the dataset 342. The first rule 360a applies if the attributes being compared are globally unique device IDs (which may be referred to herein simply as global device IDs). The second rule 360b, the third rule 360c, and the fourth rule 360d apply if the attributes being compared are not global device IDs.

The first rule 360a (which, as noted above, applies if the attributes being compared are global device IDs) specifies that a particular value 352 in the dataset 342 should be a +1 if the global device IDs match and a 0 if they do not match. For example, the first value 354a in the first set of values 352a is a 0 because the first attribute 314a associated with the current event (ID3) does not match the first attribute 346a (ID1) in the first set of stored device attributes 334a. However, the first value 358a in the third set of values 352c is a 1 because the first attribute 314a associated with the current event (ID3) matches the first attribute 350a (ID3) in the third set of stored device attributes 334c.

The second rule 360b (which, as noted above, applies if the attributes being compared are not global device IDs) specifies that a particular value 352 in the dataset 342 should be a positive inverse frequency smoothing value if the attributes being compared match. For example, the second value 354b in the first set of values 352a is a positive inverse frequency smoothing value because the second attribute 314b associated with the current event (b1) matches the second attribute 346b (b1) in the first set of stored device attributes 334a. The positive inverse frequency smoothing values are shown as +IFS in FIG. 3.

The third rule 360c (which, as noted above, applies if the attributes being compared are not global device IDs) specifies that a particular value 352 in the dataset 342 should be a 0 if the attributes being compared are both missing. For example, the third value 358c in the third set of values 352c is a 0 because the third attribute 314c associated with the current event and the third attribute 350c in the third set of stored device attributes 334c are both missing.

The fourth rule 360d (which, as noted above, applies if the attributes being compared are not global device IDs) specifies that a particular value 352 in the dataset 342 should be a negative inverse frequency smoothing value if the attributes being compared are not both missing and they do not match. The negative inverse frequency smoothing values are shown as −IFS in FIG. 3. Another way to state the fourth rule 360d is that a particular value 352 in the dataset 342 should be a negative inverse frequency smoothing value if the attributes being compared are not global device IDs and neither the second rule 360b nor the third rule 360c applies. For example, the third value 354c in the first set of values 352a is a negative inverse frequency smoothing value because the third attribute 314c associated with the current event and the third attribute 346c in the first set of stored device attributes 334a are not both missing (specifically, the third attribute 346c in the first set of stored device attributes 334a is not missing) and they do not match (the third attribute 314c associated with the current event is missing, whereas the third attribute 346c in the first set of stored device attributes 334a is c1).

Thus, the dataset 342 shown in FIG. 3 includes positive inverse frequency smoothing values corresponding to matching attributes (per the second rule 360b) and negative inverse frequency smoothing values corresponding to pairs of attributes that are not both missing and do not match (per the fourth rule 360d). In an alternative embodiment, the polarities of the inverse frequency smoothing values may be reversed. For example, the second rule 360b may be modified to indicate that a particular value 352 in the dataset 342 should be a negative inverse frequency smoothing value (instead of a positive inverse frequency smoothing value) if the attributes being compared match. Similarly, the fourth rule 360d may be modified to indicate that a particular value 352 in the dataset 342 should be a positive inverse frequency smoothing value (instead of a negative inverse frequency smoothing value) if the attributes being compared are not both missing and they do not match.

Figure 4:
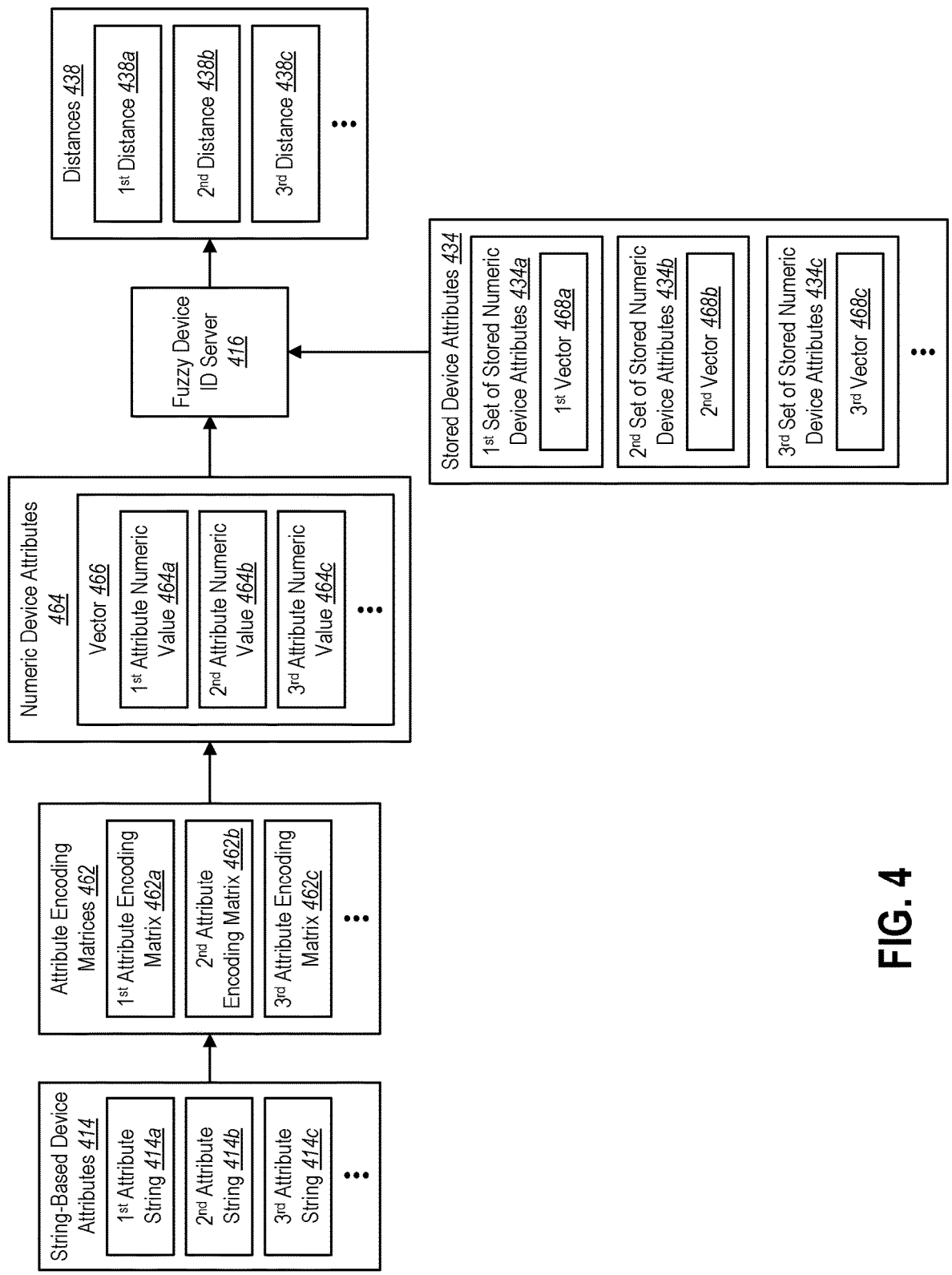
FIG. 4 illustrates an example showing how similarity metrics may be determined through attribute encoding matrices.

As indicated above, in some embodiments similarity metrics may be determined through attribute encoding matrices. FIG. 4 illustrates an example showing how this may occur. In the depicted example, the device attributes 414 that are associated with the current event (which include a first attribute 414a, a second attribute 414b, and a third attribute 414c) are initially represented as character strings. The device attributes 414 may be referred to herein as string-based device attributes 414 when they are represented as character strings. The string-based device attributes 414 may be transformed into numeric device attributes 464 via attribute encoding matrices 462. The numeric device attributes 464 are numeric representations of the string-based device attributes 414.

In the depicted example, the numeric device attributes 464 are represented as a vector 466 that includes a first numeric value 464a corresponding to the first attribute 414a in the string-based device attributes 414, a second numeric value 464b corresponding to the second attribute 414b in the string-based device attributes 414, and a third numeric value 464c corresponding to the third attribute 414c in the string-based device attributes 414. The first numeric value 464a is generated by encoding the first attribute 414a in the string-based device attributes 414 using the first attribute encoding matrix 462a. The second numeric value 464b is generated by encoding the second attribute 414b in the string-based device attributes 414 using the second attribute encoding matrix 462b. The third numeric value 464c is generated by encoding the third attribute 414c in the string-based device attributes 414 using the third attribute encoding matrix 462c.

Once the string-based device attributes 414 associated with the current event have been transformed into numeric device attributes 464, the numeric device attributes 464 may be compared with stored device attributes 434 that are associated with previous events. The encoding matrices 462 are also used to generate the stored device attributes 434, and the stored device attributes 434 also include numeric values. In the depicted example, the stored device attributes 434 include a first set of stored numeric device attributes 434a corresponding to a first previous event, a second set of stored numeric device attributes 434b corresponding to a second previous event, and a third set of stored numeric device attributes 434c corresponding to a third previous event. Just as the numeric device attributes 464 associated with the current event may be represented as a vector 466, the sets of stored numeric device attributes 434a-c may also be represented as vectors 468a-c.

The fuzzy device ID server 416 may determine distances 438 between the vector 466 corresponding to the current event and the vectors 468a-c representing the stored device attributes 434 corresponding to previous events and previously created fuzzy device IDs. In the depicted example, the fuzzy device ID server 416 determines a first distance 438a between the vector 466 corresponding to the current event and a first vector 468a corresponding to the first previous event, a second distance 438b between the vector 466 corresponding to the current event and a second vector 468b corresponding to the second previous event, and a third distance 438c between the vector 466 corresponding to the current event and a third vector 468c corresponding to the third previous event. The distances 438 may be used to determine a fuzzy ID that is assigned to the current event (e.g., similarly to the way that the similarity metrics 238 shown in FIG. 2 may be used to determine an assigned fuzzy device ID 218, as discussed above).

Figure 5:
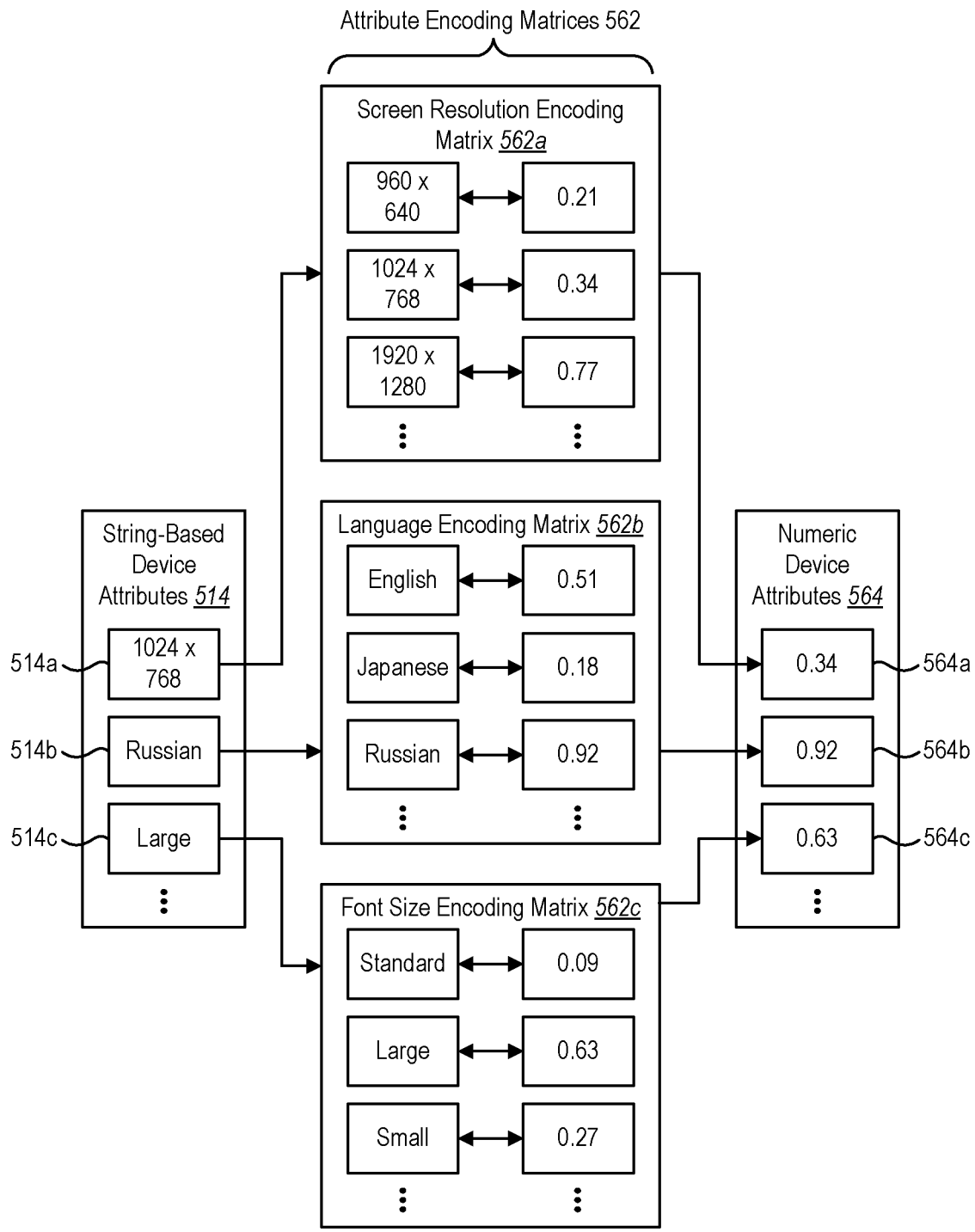
FIG. 5 illustrates an example showing how string-based device attributes may be transformed into numeric device attributes via attribute encoding matrices.

FIG. 5 illustrates an example showing how string-based device attributes 514 may be transformed into numeric device attributes 564 via attribute encoding matrices 562. A plurality of string-based device attributes 514 are associated with a current event. The string-based device attributes 514 include a string 514a representing a first attribute, a string 514b representing a second attribute, and a string 514c representing a third attribute. In the depicted example, the first attribute is screen resolution, the second attribute is language, and the third attribute is font size.

The string 514a representing the first attribute (screen resolution) is transformed into a numeric value 564a by a screen resolution encoding matrix 562a. The screen resolution encoding matrix 562a includes a plurality of possible screen resolutions (e.g., 960×640, 1024×768, 1920×1280). Each possible screen resolution is associated with a numeric value. To transform the string 514a representing the screen resolution into a numeric value 564a, the value of the string 514a (e.g., 1024×768) is located in the screen resolution encoding matrix 562a, and the numeric value associated with that string (e.g., 0.34) is identified. This produces a numeric value 564a corresponding to the screen resolution associated with the current event.

The string 514b representing the second attribute (language) is transformed into a numeric value 564b by a language encoding matrix 562b. The language encoding matrix 562b includes a plurality of possible languages (e.g., English, Japanese, Russian). Each possible language is associated with a numeric value. To transform the string 514b representing the language into a numeric value 564b, the value of the string 514b (e.g., Russian) is located in the language encoding matrix 562b, and the numeric value associated with that string (e.g., 0.92) is identified. This produces a numeric value 564b corresponding to the language associated with the current event.

The string 514c representing the third attribute (font size) is transformed into a numeric value 564c by a font size encoding matrix 562c. The font size encoding matrix 562c includes a plurality of possible font sizes (e.g., standard, large, small). Each possible font size is associated with a numeric value. To transform the string 514c representing the font size into a numeric value 564c, the value of the string 514c (e.g., large) is located in the font size encoding matrix 562c, and the numeric value associated with that string (e.g., 0.63) is identified. This produces a numeric value 564c corresponding to the font size associated with the current event.

Figure 6:
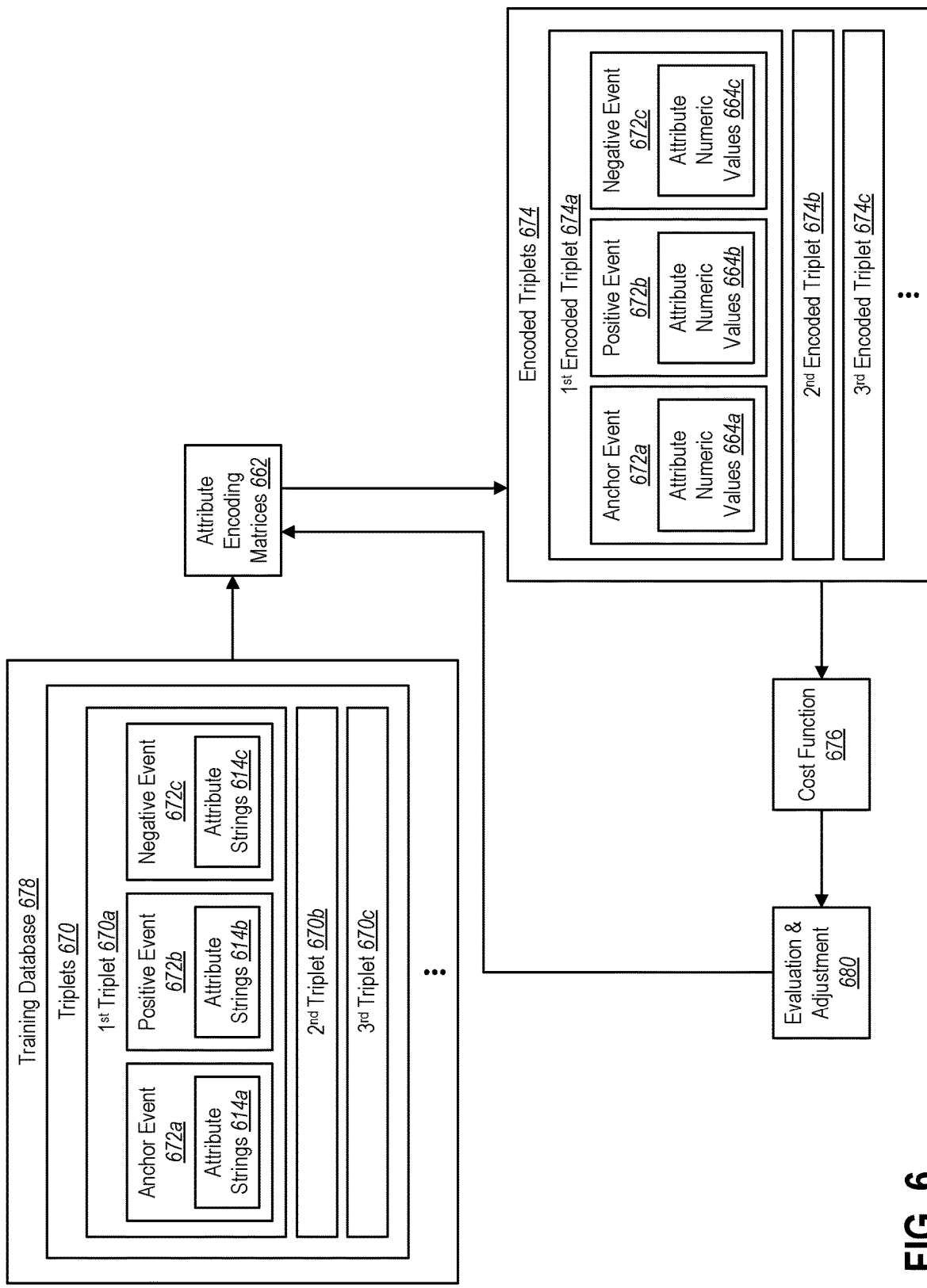
FIG. 6 illustrates an example showing how attribute encoding matrices may be trained using a triplet cost approach.

As indicated above, one aspect of the present disclosure is related to training the attribute encoding matrices. FIG. 6 illustrates an example showing how this may occur. In the depicted example, a training dataset 678 is created. Events with known global device IDs are used to create the training dataset 678. The training dataset 678 includes a plurality of triplets 670, including a first triplet 670a, a second triplet 670b, and a third triplet 670c. The first triplet 670a includes an anchor event 672a, a positive event 672b, and a negative event 672c. The positive event 672b has the same global device ID as the anchor event 672a. The negative event 672c has a different global device ID than the anchor event 672a, but is more similar to the anchor event 672a than other events with a different global device ID (e.g., as determined via logistic regression). The other triplets 670b-c also each include an anchor event, a positive event, and a negative event (although for simplicity these are not shown in FIG. 6).

The triplets 670 in the training dataset 678 are transformed into encoded triplets 674 via attribute encoding matrices 662. For example, in the first triplet 670a, the attributes 614a-c in the events 672a-c are initially represented as strings. The encoding matrices 662 transform these attribute strings 614a-c into numeric values 664a-c. Similar transformations take place in order to encode the other triplets 670 (e.g., the second triplet 670b and the third triplet 670c) into encoded triplets 674 (e.g., the second encoded triplet 674b and the third encoded triplet 674c).

The encoded triplets 674 are provided as inputs to a cost function 676. The results of the cost function 676 are evaluated. Based on the outputs of the cost function 676, adjustments may be made to the encoding matrices 662. An evaluation and adjustment module 680 is provided for evaluating the outputs of the cost function 676 and for making appropriate adjustments to the encoding matrices 662.

In some embodiments, the cost function 676 may be represented as equation (2) below:

$$\text{Cost Function} = \sum_{i=0}^{n} \max(I(i), 0) \quad (2)$$

The term I in equation (2) may be expressed as:

$$I = d(Y_A, Y_P) - d(Y_A, Y_N) + a \quad (3)$$

In equation (3), the term $d(Y_A, Y_P)$ refers to the distance between the anchor event 672a and the positive event 672b. The term $d(Y_A, Y_N)$ refers to the distance between the anchor event 672a and the negative event 672c. The purpose of the term a in equation (3) is to minimize $d(Y_A, Y_P)$ (since the anchor event 672a and the positive event 672b have the same global device ID and should therefore be assigned the same fuzzy device ID) and maximize $d(Y_A, Y_N)$ (since the anchor event 672a and the negative event 672c have different global device IDs and should therefore be assigned different fuzzy device IDs).

In some embodiments, a value for I (as represented in equation (3)) may be calculated for each of the triplets 670 in the training dataset 678. All of these values may then be summed in accordance with the cost function 676 represented in equation (2). Adjustments may be made to the attribute encoding matrices 662 based on the result of the cost function 676. For example, adjustments to the attribute encoding matrices 662 may be made if the cost function 676 compares unfavorably to a certain threshold value (e.g., exceeds a maximum threshold).

Figure 7:
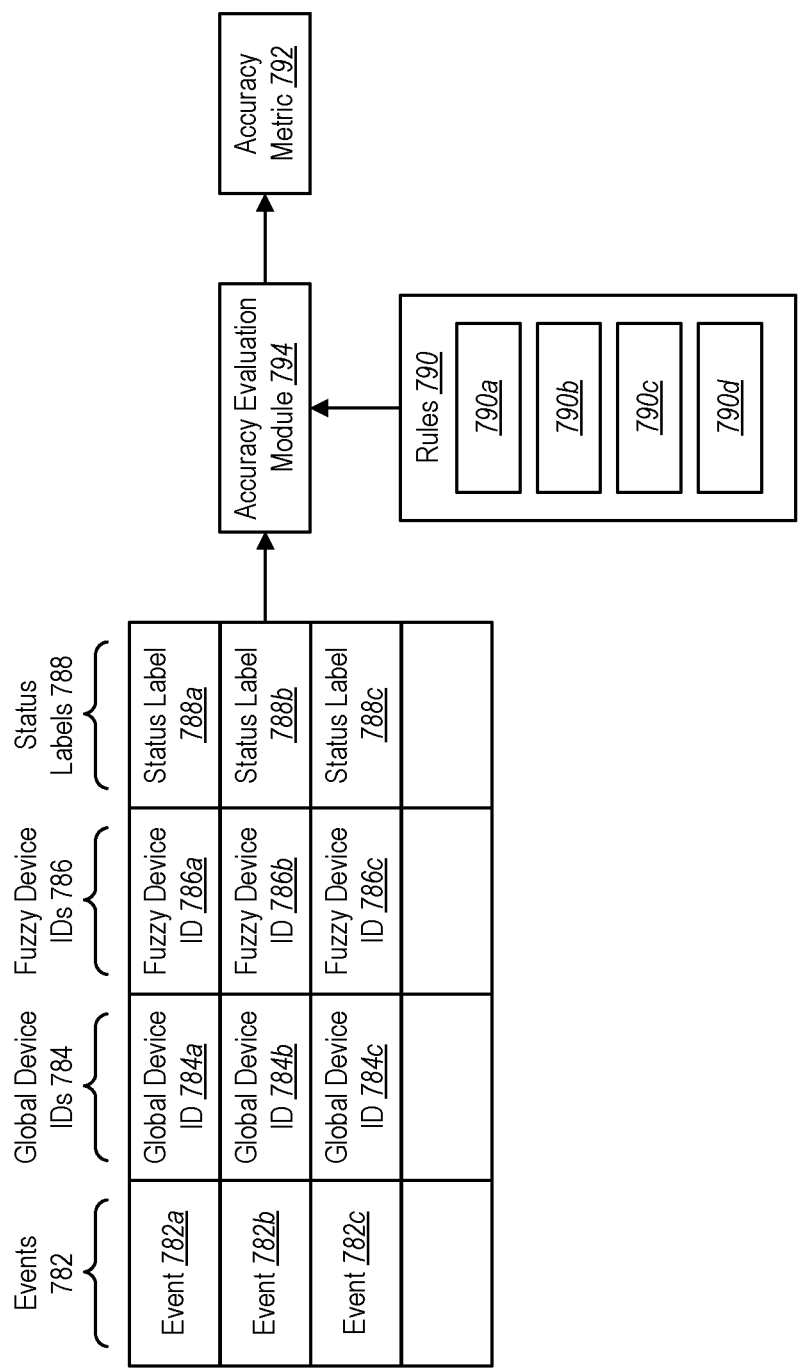
FIG. 7 illustrates an example showing how the accuracy of fuzzy device assignments may be determined.

As indicated above, another aspect of the present disclosure is related to determining the accuracy of fuzzy device ID assignments. FIG. 7 illustrates an example showing how this may occur. In the depicted example, a plurality of fuzzy device IDs 786a-c are assigned to a plurality of events 782a-c for which global device IDs 784a-c are known. Status labels 788a-c are assigned to each of the fuzzy device IDs 786a-c based on certain rules 790 that have been defined. An accuracy evaluation module 794 is shown for providing the functionality of evaluating the accuracy of the fuzzy device IDs 786a-c and assigning status labels 788a-c. The status labels 788a-c are used to determine an accuracy metric 792 that indicates the accuracy of the assignment of the fuzzy device IDs 786a-c.

A first rule 790a indicates that a status label 788 of "accurate" is assigned when a first-time fuzzy device ID 786 (i.e., a fuzzy device ID 786 that has not previously been encountered) is assigned to a first-time global device ID 784 (i.e., a global device ID 784 that has not previously been encountered). A second rule 790b indicates that a status label of "false negative" is assigned when an already assigned global device ID 784 is assigned to an unassigned fuzzy device ID 786. A third rule 790c indicates that a status label of "false positive" is assigned when an already assigned fuzzy device ID 786 is assigned to an unassigned global device ID 784. A fourth rule 790d indicates that a status label of "false negative" is preferred over a status label of "false positive." Thus, where both the second rule 790b and the third rule 790c apply, the fourth rule 790d indicates that a status label of "false negative" should be assigned.

FIGS. 8A and 8B illustrate an example showing how the rules 790a-c discussed previously may be applied to evaluate the assignment of fuzzy device IDs. Referring initially to FIG. 8A, a table 899 includes information about a plurality of fuzzy device ID assignments. The table 899 includes a global device ID column 884, a fuzzy device ID column 886, a global device ID count column 896, a fuzzy device ID count column 898, and a status label column 888.

The status labels 888 are assigned based on the rules 790a-c discussed previously. The event 882a for which F2 is assigned to G3 is an example of the first rule 790a described above. With this event 882a, F2 is assigned a status label 888 of "caccurate" because the FID count 898 for F2 is 1 and the GID count 896 for G3 is also 1.

The event 882b for which F2 is assigned to G1 is an example of both the second rule 790b and the fourth rule 790d described above. With this event 882b, F2 is assigned a status label 888 of "false negative" because G1 has previously been assigned (per the second rule 790b). F2 could alternatively have been assigned a status label 888 of "false positive" because F2 has previously been assigned (per the third rule 790c). However, based on the fourth rule 790d (which indicates that the assignment of a "false negative" status label 888 is preferred over the assignment of a "false positive" status label 888), F2 is assigned a status label 888 of "false negative."

The event 882c for which F2 is assigned to G5 is an example of the third rule 790c described above. With this event 882c, F2 is assigned a status label 888 of "false positive" because F2 has previously been assigned and G5 has not previously been assigned.

In FIG. 8A, some of the events 882d-e do not have assigned status labels 888. This is because none of the rules 790*a-d* apply to these events 882*d-e* at this point in time. In the depicted example, when all of the status labels 888 that can be assigned based on the rules 790*a-d* have been assigned, then all of the events for which status labels 888 have been assigned are cleared and the process repeats for the events for which status labels 888 have not been assigned. This is shown in FIG. 8B.

Figure 9:
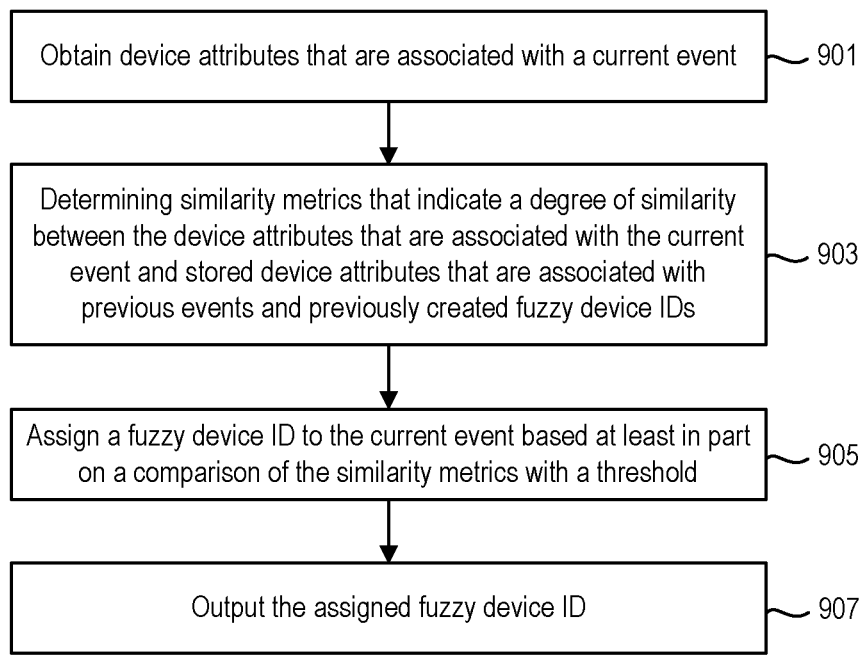
FIG. 9 illustrates an example of a method for using fuzzy device IDs to facilitate device fingerprinting in accordance with the present disclosure.

FIG. 9 illustrates an example of a method 900 for using fuzzy device IDs to facilitate device fingerprinting in accordance with the present disclosure. For the sake of clarity, the methods described herein, including the method 900 shown in FIG. 9, will be described in relation to various components that have been described previously.

The method 900 may be performed by any entity that is involved in device fingerprinting. In some embodiments, the method 900 may be performed by a fuzzy device ID server 116.

In step 901 of the method 900, device attributes 114 that are associated with a current event are obtained. In some embodiments, the device attributes 114 may be obtained from a device 102 (e.g., via a script engine 112 executing a script file 110), as discussed above. Other information (e.g., a session ID 106) may be obtained along with the device attributes 114.

In step 903, similarity metrics 238 that indicate a degree of similarity between the device attributes 114 that are associated with the current event and stored device attributes 234 that are associated with previous events and previously created fuzzy device IDs are determined.

In some embodiments, similarity metrics 338 may be determined through the use of a logistic regression model 344. For example, a dataset 342 may be created that includes results of comparing the device attributes 314 that are associated with the current event and stored device attributes 334 that are associated with previous events and previously created fuzzy device IDs. This dataset 342 may be provided as input to a logistic regression model 344, which produces the similarity metrics 338.

In some embodiments, similarity metrics 238 may be determined through attribute encoding matrices 462. In such embodiments, the similarity metrics 238 may take the form of distances 438 between vectors 466, 468*a-c*. For example, the device attributes 414 that are associated with the current event may initially be represented as character strings, and the attribute encoding matrices 462 may be used to transform the character strings 414*a-c* to numeric values 464*a-c*. Distances 438*a-c* may be determined between a vector 466 that includes the numeric values 464*a-c* and a plurality of other vectors 468*a-c* representing the stored device attributes 434 that are associated with the previous events and the previously created fuzzy device IDs.

In step 905, a fuzzy device ID 218 is assigned to the current event based at least in part on a comparison of the similarity metrics 238 with a threshold 240. For example, if none of the similarity metrics 238 compare favorably with the threshold 240, then a new fuzzy device ID may be created for the current event. However, if at least one of the similarity metrics 238 compares favorably with the threshold 240, then the previously created fuzzy device ID whose stored device attributes are most similar to the device attributes that are associated with the current event may be assigned to the current event.

Step 907 involves outputting the assigned fuzzy device ID 218. In some embodiments, this may involve providing the assigned fuzzy device ID 218 to a requesting entity. For example, a fuzzy device ID server 116 may return an assigned fuzzy device ID 118 in response to a request from another entity, such as a risk server 126.

The techniques disclosed herein provide several technical benefits relative to known approaches for device fingerprinting. For example, assigning fuzzy device IDs based on similarity metrics, as disclosed herein, provides an efficient way to match website events to particular devices. In addition, the use of device-level attributes, rather than user-level attributes, may improve the accuracy of the fuzzy device IDs that are assigned. This makes it easier to identify fraudulent transactions, even when fraudsters manipulate or block device settings in order to disguise their device fingerprints. Identifying fraudulent transactions helps electronic commerce merchants and other types of website owners to prevent loss due to fraudulent activities.

Several of the technical challenges involved with device fingerprinting, such as the skewed distribution of website traffic, may also be addressed by the techniques disclosed herein. As noted above, some devices might visit a website hundreds of times (or more) while other devices might only visit the website a few times. The use of weighted values in datasets (e.g., via inverse frequency smoothing), as disclosed herein, may help to address this problem by allowing the matching of uncommon device attributes to play a more significant role in fuzzy device ID assignment than the matching of common device attributes. Even when a device only visits a website a few times, if an uncommon attribute of that device can be identified, the techniques disclosed herein allow that attribute to have a significant influence on the fuzzy device ID that is assigned to the device. This makes it more likely that a subsequent event involving the device will result in the correct assignment of the same fuzzy device ID, regardless of how frequently the device visits the website.

The efficiency of device fingerprinting solutions may also be enhanced by the techniques disclosed herein. For example, the use of attribute encoding matrices to transform string-based device attributes into numeric values improves efficiency because this allows the similarity between two events to be computed quickly and with low latency. This makes it easier to satisfy the real-time requirements of device fingerprinting algorithms in view of the high volume of traffic that many websites experience. The use of a two-layer approach in which a fuzzy device ID database is separated into multiple partitions may provide additional efficiency gains. Furthermore, the use of machine learning algorithms to train the attribute encoding matrices improves the accuracy of the overall device fingerprinting process by tuning the attribute encoding matrices to achieve desired results.

The techniques disclosed herein also provide an efficient way to evaluate the accuracy of the fuzzy device IDs that are assigned, particularly when global device IDs are available for some events. Accuracy metrics may be determined for particular assignment algorithms, and the accuracy metrics may be used to improve the assignment algorithms and/or to select new assignment algorithms. This makes it possible to determine when a device fingerprinting algorithm is not working properly and should be modified or replaced. This can improve the overall accuracy of device fingerprinting, which makes it possible for electronic commerce merchants and other types of website owners to more effectively identify fraudulent transactions and thereby achieve significant cost savings.

At least some of the techniques for assigning fuzzy device IDs disclosed herein may provide technical benefits in the form of reduced storage requirements. As discussed above, the techniques disclosed herein can improve the overall accuracy of device fingerprinting. This makes it possible for electronic commerce merchants and other types of website owners to rely more on device fingerprinting solutions, thereby eliminating the need to obtain and store other types of information that has historically been used for purposes of fraud detection.

As another example, the use of attribute encoding matrices to determine similarity metrics can potentially eliminate the need to create datasets that include the results of comparing device attributes. Because of the enormous number (e.g., hundreds of millions) of events involved and the number of device attributes being compared, such datasets can require a large amount of storage space. By eliminating the need to create and store such datasets, the use of attribute encoding matrices can reduce the amount of storage that is required to implement device fingerprinting. Consequently, the use of attribute encoding matrices to determine similarity metrics can result in significant cost savings.

The use of attribute encoding matrices can also reduce the amount of processing that is required to compute similarity metrics. Instead of comparing values within extremely large datasets, the use of attribute encoding matrices makes it possible to perform device fingerprinting by comparing numeric vectors. This reduces the computational intensity of the comparisons that are involved in device fingerprinting. This means that device fingerprinting can be performed more quickly and efficiently for a given set of computing devices. Alternatively, device fingerprinting can be performed by less sophisticated (and less costly) computing devices than would be required to process the large datasets.

As yet another example, the use of a two-layer approach in which a fuzzy device ID database is separated into multiple partitions may additionally reduce the computational intensity of device fingerprinting. By identifying and focusing on the most relevant partition, the number of comparisons that are made between device attributes that are associated with a current event and previously stored device attributes can be reduced.

Figure 10:
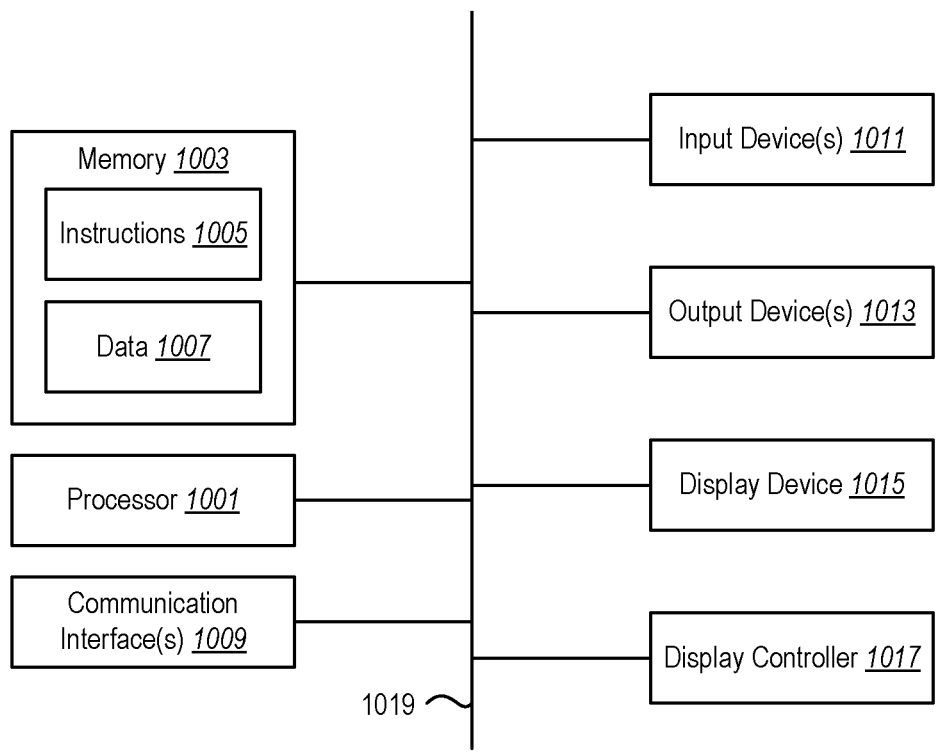
FIG. 10 illustrates certain components that may be included within a computer system.

FIG. 10 illustrates certain components that may be included within a computer system 1000. One or more computer systems 1000 may be used to implement the various devices, components, and systems described herein.

The computer system 1000 includes a processor 1001. The processor 1001 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the steps, operations, actions, or other functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth© wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for facilitating device fingerprinting, the method comprising:
    obtaining device attributes that are associated with a current event;
    determining similarity metrics that indicate a similarity correspondence between the device attributes associated with the current event and stored device attributes that are associated with previous events and previously created fuzzy device identifiers,
    determining whether a similarity metric of the similarity metrics satisfies an attribute similarity threshold;
    based on the similarity metric not satisfying the attribute similarity threshold, assigning a fuzzy device identifier for the current event by creating anew fuzzy device identifier for the current event;
    based on the similarity metric satisfying the attribute similarity threshold with stored device attributes of a previously created fuzzy device identifier, assigning the previously created fuzzy device identifier as the fuzzy device identifier for the current event;
    receiving a request decision from a risk server, the risk server having authorized the current event using the fuzzy device identifier; and
    in response to receiving the request decision from the risk server, providing the assigned fuzzy device identifier to a requesting device for facilitating the device fingerprinting.

2. The computer-implemented method of claim 1, wherein determining that the stored device attributes of the previously created fuzzy device identifier satisfies the attribute similarity threshold comprises determining that the stored device attributes of the previously created fuzzy device identifier indicates a higher degree of similarity to the device attributes that are associated with the current event than other similarity metrics.

3. The computer-implemented method of claim 1, wherein:
    the device attributes that are associated with the current event are represented as character strings;
    the similarity metrics are distances; and
    determining the similarity metrics comprises transforming the character strings to numeric values using attribute encoding matrices.

4. The computer-implemented method of claim 3, further comprising generating the attribute encoding matrices by:
    creating a training dataset that comprises a plurality of triplets, each triplet comprising an anchor event, a positive event, and a negative event;
    encoding the plurality of triplets in the training dataset using the attribute encoding matrices to generate encoded triplets;
    providing the encoded triplets as inputs to a cost-based loss model; and
    adjusting the attribute encoding matrices based on outputs of the cost-based loss model.

5. The computer-implemented method of claim 3, wherein determining the similarity metrics further comprises comparing distances between a vector that comprises the numeric values and a plurality of other vectors representing the stored device attributes associated with the previous events and the previously created fuzzy device identifiers.

6. The computer-implemented method of claim 1, wherein determining the similarity metrics comprises:
    transforming character strings representing the device attributes that are associated with the current event to numeric values using attribute encoding matrices; and
    determining distances between a vector that comprises the numeric values and a plurality of other vectors representing the stored device attributes that are associated with the previous events and the previously created fuzzy device identifiers.

7. The computer-implemented method of claim 1, wherein determining the similarity metrics comprises:
    calculating partition similarity metrics that indicate a degree of similarity between the device attributes that are associated with the current event and stored device attributes that are associated with a plurality of partitions, wherein each partition of the plurality of partitions includes a set of previously created fuzzy device identifiers and stored device attributes;
    utilizing the partition similarity metrics to select a particular partition from the plurality of partitions; and
    determining the similarity metrics that indicate the degree of similarity between the device attributes that are associated with the current event and the stored device attributes that are associated with the previous events and the previously created fuzzy device identifiers stored in the particular partition.

8. The computer-implemented method of claim 1, further comprising:
    assigning a plurality of fuzzy device identifiers to a plurality of events for which global device identifiers are known; and
    determining an accuracy metric that indicates accuracy of the assignment of the plurality of fuzzy device identifiers.

9. The computer-implemented method of claim 8, wherein determining the accuracy metric comprises assigning a status label to each of the plurality of fuzzy device identifiers based on defined rules, and wherein the defined rules specify that:
- a true positive status label is assigned when a first-time fuzzy device identifier is assigned to a first-time global device identifier;
- a false negative status label is assigned when an already assigned global device identifier is assigned to an unassigned fuzzy device identifier; and
- a false positive status label is assigned when an already assigned fuzzy device identifier is assigned to an unassigned global device identifier.

10. A computer-implemented method for facilitating device fingerprinting, comprising:
- obtaining device attributes that are associated with a current event that requires authorization from a risk server;
- determining similarity metrics that indicate a similarity correspondence between the device attributes associated with the current event and stored device attributes that are associated with previous events and previously created fuzzy device identifiers,
- determining whether a similarity metric of the similarity metrics satisfies an attribute similarity threshold;
- based on the similarity metric not satisfying the attribute similarity threshold, assigning a fuzzy device identifier for the current event by creating a new fuzzy device identifier for the current event;
- based on the similarity metric satisfying the attribute similarity threshold with stored device attributes of a previously created fuzzy device identifier, assigning the previously created fuzzy device identifier as the fuzzy device identifier for the current event;
- providing the assigned fuzzy device identifier to the risk server that cause the risk server to use the fuzzy device identifier to determine whether to authorize the current event;
- receiving a request decision from the risk server indicating authorization of the current event; and
- in response to receiving the request decision from the risk server, providing the assigned fuzzy device identifier to a requesting device.

11. The computer-implemented method of claim 10, wherein determining that the stored device attributes of the previously created fuzzy device identifier satisfies the attribute similarity threshold comprises determining that the stored device attributes of the previously created fuzzy device identifier indicates a higher degree of similarity to the device attributes that are associated with the current event than other similarity metrics.

12. The computer-implemented method of claim 10, wherein determining the similarity metrics comprises:
- transforming character strings representing the device attributes that are associated with the current event to numeric values using attribute encoding matrices; and
- comparing distances between a vector that comprises the numeric values and a plurality of other vectors representing the stored device attributes associated with the previous events and the previously created fuzzy device identifiers.

13. The computer-implemented method of claim 10, wherein determining the similarity metrics comprises:
- creating a dataset that comprises results of comparing the device attributes that are associated with the current event and the stored device attributes that are associated with the previous events and the previously created fuzzy device identifiers;
- providing the dataset as input to a logistic regression model that outputs numerical values for each set of device attributes input into the logistic regression model; and
- comparing a first set of numerical values from the device attributes that are associated with the current event with sets of numerical values from the stored device attributes that are associated with the previous events to determine the similarity metrics.

14. The computer-implemented method of claim 13, wherein:
- the results in the dataset comprise a plurality of sets of values;
- each set of values of the results corresponds to a comparison of the device attributes that are associated with the current event and a set of stored device attributes that are associated with a previous event and the previously created fuzzy device identifiers; and
- each value within a particular set of values of the results is generated by comparing a device attribute associated with the current event and a corresponding device attribute in a set of stored device attributes.

15. The computer-implemented method of claim 13, wherein determining the similarity metrics comprises creating the dataset that includes weighted values based on comparing the device attributes associated with the current event with the stored device attributes associated with the previous events.

16. The computer-implemented method of claim 15, wherein:
- the weighted values comprise inverse frequency smoothing values;
- the inverse frequency smoothing values having a first polarity correspond to matching attributes; and
- the inverse frequency smoothing values having a second polarity opposite the first polarity correspond to non-missing pairs of attributes that do not match.

17. A system for facilitating device fingerprinting, comprising:
- a processor; and
- memory comprising instructions that are executable by the processor to perform operations comprising:
  - obtaining device attributes that are associated with a current event;
  - determining similarity metrics that indicate a similarity correspondence between the device attributes associated with the current event and stored device attributes that are associated with previous events and previously created fuzzy device identifiers,
  - determining whether a similarity metric of the similarity metrics satisfies an attribute similarity threshold;
  - based on the similarity metric not satisfying the attribute similarity threshold, assigning a fuzzy device identifier for the current event by creating a new fuzzy device identifier for the current event;
  - based on the similarity metric satisfying the attribute similarity threshold with stored device attributes of a previously created fuzzy device identifier, assigning the previously created fuzzy device identifier as the fuzzy device identifier for the current event;
  - receiving a request decision from a risk server, the risk server having authorized the current event using the fuzzy device identifier; and
  - in response to receiving the request decision from the risk server, providing the assigned fuzzy device identifier to a requesting device for facilitating the device fingerprinting.

18. The system of claim 17, wherein determining that the stored device attributes of the previously created fuzzy device identifier satisfies the attribute similarity threshold comprises determining that the stored device attributes of the previously created fuzzy device identifier indicates a higher degree of similarity to the device attributes that are associated with the current event than other similarity metrics.

\* \* \* \* \*